No. 831,061.　　　　　　　　　　　　　PATENTED SEPT. 18, 1906.
D. C. GURNEE.
CIPHER CODE OR SYSTEM.
APPLICATION FILED MAY 14, 1906.

1- BABAB-GIVE US YOUR OPINION
2- BACEB-HAVE YOU ANY OPINION
5- BAGUB-ABOUT THE MATTER
6- BAHBA-BID US
14- BASOB-WHAT OFFER
15- BATUB-HAVE COME

Fig 2

B

241- CABBA-AS SOON AS POSSIBLE
242- CACBE-QUITE POSSIBLE
243- CADBI - IS IT POSSIBLE
245- CAFBO-WILL IT BE POSSIBLE
245  CAGBU-WILL NOT BE POSSIBLE

Fig 3

M

15001- LABAM-CAN YOU GET OFFER
15002- LACEM-HAVE YOU AN OFFER
15003- LADIM-OFFER FOR} AB
15004- LAFOM-GET OFFER
15005- LAGUM-WILL NOT OFFER
15006- LAHAM-WILL YOU OFFER

Fig 4

P

24002- RABAP-MUST BE SHIPPED
24003- RACEP-NOT YET SHIPPED
24004- RADIP-HAVE SHIPPED} AC
24005- RAFOP-WERE SHIPPED
24006- RAGUP-WHY NOT SHIPPED

WITNESSES:
C. H. Seem
J. W. Jochum, Jr.

INVENTOR
D. C. Gurnee
BY
Brownsley & Hopkins
ATTORNEYS

No. 831,061. PATENTED SEPT. 18, 1906.
D. C. GURNEE.
CIPHER CODE OR SYSTEM.
APPLICATION FILED MAY 14, 1906.

5 SHEETS—SHEET 2.

Fig 5
Sold.

27005-Tabar-Cannot Be Sold
27006-Tacer-Could Be Sold
27007-Tadir-Have Sold} AD
27008-Tafor-Have Sold ¼ Cons} AF
27009-Tagur-Have Sold ½ Cons}

Fig 7
Offer

15000-Luzun-Offer
15001-Labam-Can You Get Offer
15003-Ladim-Offer For} AB
15005-Lagum-Will Not Offer
15006-Laham-Will You Offer

Fig 6
Opinion

1-Babab-Give Us Your Opinion
2-Baceb-Have You Any Opinion
496-Badic-Our Opinion Is
542-Maxoj-They Express No Opinion
926-Tayer-Get Some Opinion No. 831,061. PATENTED SEPT. 18, 1906.
D. C. GURNEE.
CIPHER CODE OR SYSTEM.
APPLICATION FILED MAY 14, 1906.

5 SHEETS—SHEET 3.

Fig 14

Indicators For Tables.

| | | | | | | | | | | | | | | | | | | | | | | | | |
|---|---|---|---|---|---|---|---|---|---|---|---|---|---|---|---|---|---|---|---|---|---|---|---|---|
| A_B | A_C | A_D | A_F | A_G | A_H | A_J | A_K | A_L | A_M | A_N | A_P | A_R | A_S | A_T | A_V | A_W | A_X | A_Y | A_Z |
| E_B | E_C | E_D | E_F | E_G | E_H | E_J | E_K | E_L | E_M | E_N | E_P | E_R | E_S | E_T | E_V | E_W | E_X | E_Y | E_Z |
| I_B | I_C | I_D | I_F | I_G | I_H | I_J | I_K | I_L | I_M | I_N | I_P | I_R | I_S | I_T | I_V | I_W | I_X | I_Y | I_Z |
| O_B | O_C | O_D | O_F | O_G | O_H | O_J | O_K | O_L | O_M | O_N | O_P | O_R | O_S | O_T | O_V | O_W | O_X | O_Y | O_Z |
| U_B | U_C | U_D | U_F | U_G | U_H | U_J | U_K | U_L | U_M | U_N | U_P | U_R | U_S | U_T | U_V | U_W | U_X | U_Y | U_Z |

Fig 8

"CH" TO PRECEDE THE VOWEL AND CONSONANT SHOWN BELOW WHEN VOCABULARY WORDS ARE CHECKED. USE THE VOWEL AND CONSONANT ONLY WHEN THE TABLE IS USED ALONE, OR IN CONJUNCTION WITH ONE OR MORE VOCABULARY WORDS.

| | B | C | D | F | G | H | J | K | L | M | N | P | R | S | T | V | W | X | Y | Z |
|---|---|---|---|---|---|---|---|---|---|---|---|---|---|---|---|---|---|---|---|---|
| A | 00 | 05 | 10 | 15 | 20 | 25 | 30 | 35 | 40 | 45 | 50 | 55 | 60 | 65 | 70 | 75 | 80 | 85 | 90 | 95 |
| E | 01 | 06 | 11 | 16 | 21 | 26 | 31 | 36 | 41 | 46 | 51 | 56 | 61 | 66 | 71 | 76 | 81 | 86 | 91 | 96 |
| I | 02 | 07 | 12 | 17 | 22 | 27 | 32 | 37 | 42 | 47 | 52 | 57 | 62 | 67 | 72 | 77 | 82 | 87 | 92 | 97 |
| O | 03 | 08 | 13 | 18 | 23 | 28 | 33 | 38 | 43 | 48 | 53 | 58 | 63 | 68 | 73 | 78 | 83 | 88 | 93 | 98 |
| U | 04 | 09 | 14 | 19 | 24 | 29 | 34 | 39 | 44 | 49 | 54 | 59 | 64 | 69 | 74 | 79 | 84 | 89 | 94 | 99 |

WITNESSES:

INVENTOR

BY

ATTORNEYS

THE NORRIS PETERS CO., WASHINGTON, D. C.

No. 831,061.
PATENTED SEPT. 18, 1906.
D. C. GURNEE.
CIPHER CODE OR SYSTEM.
APPLICATION FILED MAY 14, 1906.

| Quantity | Article | Price | Shipment |
|---|---|---|---|
| 1 Ab  1 | 1 Ab Pure Lard | 1 Ab 0/ | 1 Ab Prompt |
| 2 Ac  5 | 2 Ac Pure Lard Tcs. | 2 Ac 0/3 | 2 Ac All Prompt |
| 3 Ad 10 | 3 Ad Pure Lard ½ Bbls. | 3 Ad 0/6 | 3 Ad Immediate |
| 4 Af 15 | 4 Af Pure Lard Pails | 4 Af 0/9 | 4 Af 1st ½ This Month |
| 5 Ag 20 | 5 Ag Compound Lard | 5 Ag 1/- | 5 Ag 2nd ½ This Month |
| 10 Am 125 | 9 Al Compound Lard Tcs. | 10 Am 2/3 | |
| 11 An 150 | | 11 An 2/6 | |
| 12 Ap 175 | | | |
| 13 Ar 200 | | | |

Ac

Fig 10

| Quantity | Article | Steamer | Sailing |
|---|---|---|---|
| 1 Ac 10 (Cases) | 1 Ab Canned Meats | 1 Ab Statendam | 1 Ab ---- |
| 2 Ad 20 (Cases) | 2 Ac Lunch Tongues 24/1 Lb | 2 Ac Amsterdam | 2 Ac 1st Inst. |
| 3 Af 30 (Cases) | 3 Ad Lunch Tongues 24/2 Lb | 3 Ad Amsteldyk | 3 Ad 2nd Inst. |
| 4 Ag 40 (Cases) | 4 Af Lunch Tongues 48/1 Lb | 4 Af Soestdyk | 4 Af 3rd Inst. |

Ap

Fig 11

| Quantity | Article | Price | Shipment |
|---|---|---|---|
| 1 Ad 10 Boxes | 1 Ab S.F. Backs 10/12 Lb | 1 Ab 0/ | 1 Ab Prompt |
| 2 Af 15 Boxes | 2 Ac S.F. Backs 12/14 Lb | 2 Ac 0/6 | 2 Ac Immediate |
| 5 Aj 30 Boxes | 5 Ag S.P. Picnics 5/6 Lb | 5 Ag 1/- | 5 Ag Month After Next. |

WITNESSES:
INVENTOR
BY
ATTORNEYS

THE NORRIS PETERS CO., WASHINGTON, D. C.

No. 831,061.  
PATENTED SEPT. 18, 1906.  
D. C. GURNEE.  
CIPHER CODE OR SYSTEM.  
APPLICATION FILED MAY 14, 1906.

5 SHEETS—SHEET 5.

Fig 12

Repetition
1 Ab 10
2 Ac 20
3 Ad 30
4 Af 40
5 Ag 50
6 Ah 60
7 Aj 70
8 Ak 80
9 Al 90
10 Am 100
11 An First Quality
12 Ap Bad Quality
13 Ar - - -

Price
1 Ab %
2 Ac %3
3 Ad %6
4 Af %9
5 Ag 1/-
6 Ah 1/3
7 Aj 1/6
8 Ak 1/9
9 Al 2/-

Consignment Number
B-- 0
1 C 1
2 D 2
3 F 3
4 G 4
5 H 5
6 J 6
7 K 7
8 L 8
9 M 9
10 N
11

A-- 0
1 E 1
2 I 2
3 O 3
4 U 4
5 Y 5
6

1 Af 1
2 Ag 2
3 Ah 3
4 Aj 4
5 Ak 5
6 Al 6
7 Am 7
8 An 8
9 Ap 9

Fig 13

Consignment Number
B-- 0
1 C 1
2 D 2
3 F 3
4 G 4
5 H 5
6 J 6
7 K 7
8 L 8
9 M 9
10 N
11

A-- 
1 E 5
2 I 6
3 O 7
4 U 8
5 Y 9
6

1 Ar 1
2 As 2
3 At 3
4 Av 4
5 Aw 5
6 Ax 6
7 Az 7
8 Ab 8
9 Ac 9

Af

WITNESSES:

INVENTOR

BY

ATTORNEYS

THE NORRIS PETERS CO., WASHINGTON, D. C.

UNITED STATES PATENT OFFICE.

DANIEL C. GURNEE, OF CHICAGO, ILLINOIS, ASSIGNOR TO THE METROPOLITAN CODE CO., OF CHICAGO, ILLINOIS, A CORPORATION OF ILLINOIS.

CIPHER CODE OR SYSTEM.

No. 831,061.  Specification of Letters Patent.  Patented Sept. 18, 1906.

Application filed May 14, 1906. Serial No. 316,750.

*To all whom it may concern:*

Be it known that I, DANIEL C. GURNEE, a citizen of the United States, residing at Chicago, in the county of Cook and State of Illinois, have invented certain new and useful Improvements in Cipher Codes or Systems, of which the following is a full, clear, and exact specification.

This invention relates to improvements in cipher codes or systems; and the object of the same is to provide an improved code or system by means of which any desired message may be transmitted with great economy.

A further object is to provide an improved code or system by means of which a message may be transmitted, the message itself including a check, by means of which the receiver or the person decoding the message may readily ascertain whether it was transmitted correctly or incorrectly received.

A further object is to provide an improved code or system for transmitting messages whereby the message will contain a character or symbol as an indicator to the person decoding the proper manner to decode the particular message.

A further object is to provide an improved telegraph code or system by means of which the arrangement of the message itself may be used as an indicator of the proper manner of decoding or deciphering the same.

A further object is to provide an improved code or system by means of which a message containing more than one expression may be sent in a single word of ten letters or less, each expression being provided with an indicator, which may be used or ignored in decoding the same, as the necessity requires.

To the attainment of these ends and the accomplishment of other new and useful objects as will appear, the invention consists in the features of novelty in the combination and arrangement of the various words, terms, expressions, characters, symbols, numerals, and the like, hereinafter more fully described, and claimed and shown in the accompanying drawings, illustrating an exemplification of the invention, and in which—

Figures 1, 2, 3, and 4 are views illustrating portions of some of the different series of the vocabulary or root words. Figs. 5, 6, and 7 are views illustrating the manner of assembling the vocabulary or root words of the same general meaning under a common heading. Fig. 8 is a view of the vowel and consonant or check table. Figs. 9, 10, 11, and 12 are views of the various tables used in conjunction with the vocabulary or root words. Fig. 13 is a modified arrangement of a portion of Fig. 12. Fig. 14 is a view giving the indicators for the various tables.

In compiling a code or system of this character, there is first provided a series of expressions, statements, questions, phrases, and the like used in ordinary business transactions. These expressions may be arranged in any desirable manner for convenience and ready reference, such as alphabetically or in groups, as shown in Figs. 5, 6, and 7 of the drawings, and suitably indexed, so that when desiring to send a message containing a specific expression the expression may be readily found by the index. Associated with these expressions is a cipher comprising a series of words or combination of letters constituting what will hereinafter be designated as "vocabulary" or "root" words, as shown in Figs. 1 to 4 of the drawings. These vocabulary or root words may be formed in any manner by alternately combining a consonant and a vowel letter in any suitable manner, the only requisites in this exemplification of the invention being that the initial letter of each word must in every instance be a consonant, that the word must contain five letters, and that either the fourth or fifth letter must also be a consonant. This latter requisite is determined by the combination of the letters producing the vocabulary-word. If in combining the letters to produce the vocabulary or root word it should so happen that the fourth letter is a vowel, as "Baba," then the fifth letter must be a consonant, such as "Babab," as illustrated by the first word in the first column of the series shown in Fig. 1 of the drawings. If, on the contrary, the combination of the letters should produce a vocabulary or root word the fourth letter of which would result in a consonant, such as "Bahb," as shown by the sixth word in the first column of the series in Fig. 1, then the fifth or following letter must be a vowel, such as "a." In this exemplification of the invention the vocabulary or root words may be produced in any desired manner, either by rule or otherwise; but the manner of their production is not an essential element and forms no part of this invention, as the letters are arranged and the words formed by the compiler and not the users. In every instance, though, as has been said, these vocabulary or root words commence with a consonant and either the fourth or fifth letter must also be a consonant. This latter requirement is necessary, as either one of them, whichever one of the two is a consonant, is used for what will be designated an "indicator" or "series" letter. In this exemplification of the invention there is employed nineteen different series letters, which comprise all of the consonants of the alphabet, (including the letter "Y" as a consonant,) except the letters "Q" and "X," as they are considered undesirable letters in transmitting a message by this code or system. These series letters are used in order that the possibilities and the extent of the code may be greatly increased and also as a ready reference or indicator by means of which the vocabulary or root word may be quickly found. Under each of the series letters the consonants and vowels are so arranged and combined as to produce every possible combination of the letters used to produce the greatest number of vocabulary or root words, regardless of whether the words produced have an accepted meaning or not. In arranging these letters to produce words for each series the consonant used for the fourth or fifth letter is the series letter and must correspond with the series—that is, either one of these letters designates to which series the particular word belongs. For instance, if the fourth or fifth letter should be the letter "b" that would indicate or designate that the word would be found classified under "Series B." If, however, one of them should be any other consonant, such as "m" or "r," the word would be found classified or arranged under "Series M" or "Series R," as the case may be, and so on for each of the respective series. The vocabulary or root words under each series are preferably arranged in alphabetical order—such, for instance, as shown under "Series B" in Figs. 1 and 2 of the drawings. After the words have been arranged in the entire series a numeral is placed in front of each, commencing with the numeral 1 and numbering the words consecutively from one series to another, for a purpose to be hereinafter set forth.

After the vocabulary or root words have been arranged and numbered an expression, statement, phrase, question, or the like is placed after each one of them—such, for example—

1-Babab—Give us your opinion.
       2-Baceb—Have you any opinion?
       5-Bagub—About the matter.
       15003-Ladim—Offer for.

as shown in the various figures of the drawings. Thus it will be seen that each and every vocabulary or root word has a certain significance and an independent number, (the numbers here associated with each of the root or vocabulary words being selected only for the purpose of illustrations and are not necessarily the correct numbers, as will be understood.) These numbers, as will be explained, are used as a check for checking the message to ascertain whether the correct message has been received.

Suppose now it is desired to send the following message by this code or system: "Give us your opinion about the matter." The operator first finds as much of the expression in the vocabulary according to a suitable index. This he finds under the word "Opinion" (see Fig. 6) to be "Give us your opinion," and in front of the expression he finds the vocabulary or root word "1-Babab." The vocabulary or root words and the expressions may be cross-indexed in the usual manner, if desired, for convenience. Having ascertained this portion, he now looks in the same manner for the remaining portion, "About the matter," which he finds to be "5-Bagub." Placing these words together, the cipher word "Bababbagub" is obtained, which word is sent over the wire and contains the maximum number of letters permissible for a single word, (which is ten letters.) The person receiving the message will be able to tell at a glance just how to decode the message and where to look to find the vocabulary or root word. For instance, he knows that in every instance the vocabulary or root word contains five letters. As the message commences with a consonant, he looks at the fourth letter, which in this example is "a," a vowel. Therefore he takes the next or fifth letter, which is "b," a consonant. This, therefore, is his index or series letter. Having ascertained this much, he now turns in his vocabulary to "Series B" and looks for the word "Babab," after which he finds the expression, "Give us your opinion." (See Fig. 1.) This leaves the last half of the word, and as it also commences with a consonant he sees that the fourth letter is a vowel; but the fifth is a consonant, which in this instance is the same as in the first half of the message, "b." This again refers him to the "Series B" in the vocabulary, where he finds the word associated with the expression "About the matter." This same method is followed in decoding all messages where the first and last half of the words begin with a consonant, the only difference being that the series letters may vary. In no instance is the check-number, which is found opposite the vocabulary or root word, sent over the wire. They are used in no other manner and for no other purpose than as a check. Suppose now that this message was a very important one or it was desired to check the message in order to insure proper receipt and to avoid the necessity of repeating the same. For this purpose there is provided a table comprised of vowels, consonants, and numerals arranged in any suitable manner; but the form and arrangement shown in Fig. 8 of the drawings is preferable as being a simple and efficient arrangement. In this arrangement all of the consonants except "Q" (twenty in number, including "Y" as a consonant) are placed in a horizontal line, and at one end of the line are placed the five vowels, arranged in a vertical column and in such a position that the first vowel will be below the line of consonants and to one side thereof. Then commencing under the letter "B" and opposite the letter "A" are placed 0 0, then under that and opposite "E"-, 01, and so on down to "U," which would be 04. At the top of the next column under "C" and opposite "A" is placed 05, and so on from the top to the bottom of each succeeding column until ninety-nine numbers are obtained, which will occur under "Z," and in line with "U", as clearly seen in Fig. 8 of the drawings. Associated with the check-table is the syllable "Ch," which may be combined with the vowel and consonants of the table in some instances, and in others it may be omitted, as will be explained. This check-table coöperates with the specific numerals already referred to, which occur before the vocabulary or root words.

Suppose now that the sender of the message above referred to, "What is your opinion about the matter?" desired to be sure that the message was accurately received. This may be accomplished by the payment of a single extra word in the following manner: It has been seen that the vocabulary or root words which would transmit this message were found in the vocabulary to be 1-Babab—Give us your opinion.
5-Bagub—About the matter.

The check is prepared by adding the numerals "1" and "5," making "6." The transmitter now refers to the check-table and looks for "6" (or "06.") He finds this in the column of figures under the consonant "C" and in a line with the vowel "E," which would indicate that the check-syllable for the message containing only the two words referred to would be "EC," which he would add to the other letters to be sent over the wire, making the message to be sent read "Bababbagubec." The maximum number of letters in one word being limited to ten, the syllable "EC" would have to be sent as a separate or additional word, which would give an odd message as well as constitute a bad arrangement. In order to obviate this arrangement and merely produce a euphonious word, the prefix "Ch" is added to the check - syllable,. thus producing "Chec," which does not increase the cost of the message, as the extra syllable must be paid for anyway, as an entire word. Thus the message would read "Bababbagub Chec." In decoding this message the entire first cipherword would be decoded in the manner as has already been described. The decoder will then take the letters "ec" as a check, knowing that the letters "Ch" are a meaningless prefix, as this syllable occurs in no other place and for no other purpose throughout the entire system or code. He now refers to the check-table, Fig. 8, and, locating the vowel-letter "E," follows the line of figures opposite this letter until he comes to the figure in the column under the consonant-letter "C," which he finds to be "06" (or "6.") Adding the numerals "1" and "5," which appear before the two vocabulary or root words "1-Babab" and "5-Bagub," gives "6." The numbers being the same, he determines the message is correct. Suppose now instead of receiving the above correct words the message through some accident or mistake was received as follows: "Bababbatub Chec." Decoding in a similar manner we have 1-Babab—Give us your opinion.
15-Batub—Have come.

The numerals "1" and "15" are then added, not in the usual manner, 1 plus 15, but 1 plus 1 plus 5 equals 7, (which method of addition is followed throughout this system.) Now referring to the numeral "7" or "07" in the check-table, Fig. 8, it is discovered that the check-syllable for the words, the product of their associated numbers, when added in this manner would be "7" or "IC," to which the prefix "Ch" is added, producing "Chic." Referring to the check in the message and eliminating the prefix, he discovers that the check should be "EC" and not "IC." He at once knows that there is some mistake, although the message as decoded may apparently be an intelligent one, and refers the same to the company for repetition, whereupon he receives the correct message "Bababbagub Chec," which decoded will give the check-number "6" or "06," which corresponds with the sum of the numerals appearing before the vocabulary or root word. The prefix letters "Ch" are used only when the check letters or syllable, such as "EC" or "IC" alone constitute the additional word. In many instances a message may be sent containing three vocabulary or root words comprising fifteen letters, and in this instance the syllable or letters "Ch" may be omitted and the check-letters themselves added directly to the last vocabulary or root word, which constitutes the second word, thus making seven letters in the last word, as will be understood. In this system or code there is also provided a series of tables, as shown in Figs. 9 to 12. These tables are specially prepared for the individual party to meet the specific requirements, and each table preferably comprises four columns, designating quantities, articles, prices, time of shipment, manner of shipment, or any other information which it is desired to send and which may be sent without necessitating the use of a vocabulary or root word. These tables may be compiled in any desired manner and preferably comprise columns of syllables or two letters. These tables differ from the tables of vocabulary or root words in that the first letter of each syllable is a vowel instead of a consonant and each comprises a vowel and a consonant. The same combination of letters may be used in each column to designate different things without danger of the message being confused, as will be understood. Associated with each of these tables is an indicator, a series of which is shown in Fig. 14. These indicators each preferably comprise two letters, the first one of which is always a vowel and the second one a consonant, similar to the tables themselves.

In Fig. 9 there is shown a table having an indicator "Ab," the indicator for the table shown in Fig. 10 is "Ac," while that for Fig. 11 is "Ad," and so on for as many tables as used. These tables, as has been stated, preferably comprise four columns and are so arranged that in no instance will the first syllable or the first letters in the first column of any of the tables be the same. The indicator-letters may, if desired, be employed to start the first column. For instance, in Fig. 9 the indicator "Ab" and the first letters in the first column are also "Ab." The subsequent indicator-letters may all be used in the first column, if desired, either at the end or in any other position except at the top. The second, third, and fourth columns are common to each other and may commence with the same letters as the indicator. In Fig. 10 the indicator is "Ac," while in Fig. 11 it is "Ad," and in each instance it will be noted that the first column commences with the indicator-letters. If desired and as shown, the indicator may be placed above the table, as shown, for a ready reference, although this is not necessary. At the right of each of these letters in all of the columns is placed a price, quotation, or remark, and at the left thereof is placed a number, preferably commencing at the top of each column with "1" and numbering them consecutively to the bottom. These numbers are used in the same manner as those associated with the vocabulary or root words and are also for the purpose of checking the message. In transmitting a message from these tables the columns must be always read from left to right. After some of the expressions in the tables of vocabulary or root words there is arranged one of the indicators of Fig. 14, as shown by the third word in the columns in Figs. 3 and 4, the third, fourth, and fifth in Fig. 5, and the third in Fig. 7. These indicators may be used or ignored whenever desired. For instance, if it is desired to send a message containing a general expression or instruction which commenced with "Offer for" (see Fig. 3) or "Have shipped," Fig. 4, &c., which is combined with another vocabulary or root word to obtain the message, then the indicator may be disregarded, but is used only in connection with the tables. Suppose it is desired to send the following message: "Offer for 150 tierces pure lard at 1/—. Shipment first half this month." In the group of words under the heading "Offer" is found the vocabulary or root word "15003—Ladim" followed by the indicator "Ab," which latter refers to table "Ab." In the various columns of the table indicated by "ab" will be found the following, reading from left to right—

1st Column 11-An 150.
2nd  "   2-Ac  Pure lard tierces.
3rd  "   5-Ag  1/—.
4th  "   4-Af  1st ½ this month.

By adding these syllables to the vocabulary or root word we obtain "Ladimanacagaf." Splitting the combination and taking the first ten letters for the first word "Ladimanaca" leaves "gaf." The sum of the numerals preceding these words, added in the following manner: 1 plus 5 plus 0 plus 0 plus 3 plus 1 plus 1 plus 2 plus 5 plus 4, equals 22. In the check-table it will be found that the check-letters for 22 are "IG," which added to the three letters of the last word will give the message to be sent "Ladimanaca Gafig," in this instance, as before explained, the prefix "Ch" being omitted with the check as being unnecessary. When the message is received, the person decoding the same will at once see that the first word commences with a consonant. Therefore he is aware that the first portion of the message will be found among the vocabulary or root words, and taking the first five letters he finds the word to be "Ladim." The fourth letter thereof being a vowel and the fifth a consonant, "m" indicates that he will find the words in the series "M." He now finds that the second half of the first word commences with a vowel which indicates that the rest of the message will be found in the tables, and as the indicator "Ab" is found after the vocabulary or root word he turns to the "Ab" table, dividing the rest of the message in syllables and reading from left to right. Using all of the tables he obtains the rest of the message. Then adding up the check-numbers, which amount to "22," he refers to the check and discovers that the check for "22" is the last syllable of the message or "IG."

In many instances it may be desired to specify the goods by consignment-number and price. For this purpose there is provided a table, as shown in Fig. 12. This table is arranged in a similar manner as the remaining tables and is also provided with an indicator, which in the illustration is "AF" and occurs as the first syllable or letters in the first column. The indicator may also be applied to the top of the table, as shown, if desired, for convenience to assist in finding the same. In order to permit a number containing three figures to be transmitted without necessitating the use of six letters, as would be the case if the uniformity of the tables was carried out, the characters are arranged designating the numbers in three columns, as shown in Figs. 12 and 13. With this arrangement the first column commences with the indicator and contains nine syllables or characters, after each of which is placed a numeral from "1" to "9," and to the left thereof is a check-number. In the next column is arranged the six vowels, (in this instance "Y" is used as a vowel,) and these vowels are arranged so that one occurs in line with each of the first six characters of the first column. These vowels are also provided with a check-number, and to the right of the last four are arranged the numerals "1" to "4." The letter "A" is left blank, and a zero is arranged after the vowel "E." The third series of the first columns is also composed of single consonant letters, preferably eleven in number, the letter "B" being left blank, and a zero is placed after "C." These letters are numbered "1" to "9" from "D" to "N." Thus it will be seen that if it is desired to transmit the number "10" (reading from left to right and utilizing the three series of the first column) the following letters or characters would be used:

1 Af-1, 2 E-0, 1 B-, the last character being blank, as would be understood. With this arrangement it will be noted that only "949" can be transmitted thus: "Apyn" equals "Ap-9 plus Y-4 plus N-9" equals "949."

In order to increase the capacity of the consignment-number tables, separate tables may be provided, such as shown in Fig. 13, in which instance "999" may be transmitted, and in each instance a different indicator may be used, as will be understood.

The second general column, as shown in Fig. 12, will indicate prices and designates only tens, the hundreds being understood. In transmitting a message quoting a price for a staple article the price of which does not fluctuate very much the second general column may be used and when received will be understood. Thus, for instance, (in English currency,) if an article sold for thirty-one shillings the message would be sent "1/—," omitting the "30," and the receiver would supply the "30," knowing that to be the accepted price. It sometimes happens that the price fluctuates ten or twenty or even more points—that is, the price does not remain uniform. In order to provide for this contingency, an additional column may be provided, which for sake of convenience is designated "Repetition." The table is used with the price-table in the following manner: If the price has fluctuated ten points, instead of simply despatching the message "5 ag-1/—" the repetition-table would also be used, so that the last portion of the message would appear "Agaf," meaning "forty-one shillings" instead of the accepted quotation "thirty-one shillings." A message sent by these last tables may also be checked in a manner similar to the other tables, as each is provided with a series of check-numbers. Obviously this last table may also be used for any other purpose, such as for expressing quality, &c.

In sending a message if the desired vocabulary or root word does not refer to a specific table and it is desired to use an expression in any of the first columns other than that following the indicator-letters of that table or it is desired to use a table other than that to which the indicator refers then the sender must use the vocabulary-word indicating the desired expression and after which there appears no indicator character. In this instance the proper indicator of the desired table may themselves be added to the vocabulary or root word and then the letters from the first column added to the indicator-letters and the successive columns used in the same manner, the following message illustrating an example in which the indicator following the desired expression is used: "Will you offer 150 tierces pure lard, 1/—. Immediate shipment" would be sent as follows: "Lahamabana Cagadug," the first five letters being the vocabulary-word, which is followed by "ab," the indicator, the next two, "an," being the quantity, "ac" the article, "ag" the price, "ad" the shipment, and the last two, "ug," is the check.

A code of this character is so compiled that the product of the check-numbers of two or more sets of vocabulary-words which might be combined to formulate a message would never be the same, thereby obviating any conflict or complication which might arise by using the same check syllable or character for two or more combinations. Furthermore, the expressions are so arranged that a table-indicator will never occur in a message after a vocabulary or root word which ends with a vowel, but may follow a word ending with a consonant. This arrangement is preferred in order to prevent two vowels following each other.

In transmitting messages with this code or system it is not necessary nor is it desired to use the prefix or syllable "Ch" with the check syllables or characters of the tables, but is preferably used only in combination with the vocabulary or root words—that is, when two or more of the vocabulary or root words are combined to formulate a message.

Thus it will be seen that with these various tables numerous messages may be sent and that the table used will be indicated by the message itself. Furthermore, the arrangement of the message by the use of consonants in one instance and vowels in another will indicate at a glance to the decoder the fact whether the message was sent from a table or from the vocabulary or root words. These various tables may be assembled in any suitable manner, such as by printing them upon leaves and binding them in the form of a book suitably arranged and indexed for ready reference.

It is to be understood that it is not desired to be limited to the exact combination and arrangement of the various letters or characters, nor the specific manner of grouping and assembling the same, as numerous changes may be made therein without departing from the spirit of the invention.

What is claimed as new is—

1. A cipher-code comprising vocabulary characters, each of which is associated with a check and a concise statement, said characters being adapted to be combined to formulate a message, and a check-table adapted to coöperate with the respective checks of the characters used, to designate an additional character to be combined with the message for checking or proving the accuracy of the message.

2. A cipher-code comprising vocabulary characters, each of which is associated with a check and a concise statement, said characters being adapted to be combined to formulate a message, a check-table adapted to coöperate with the respective checks of the characters used, to designate an additional character to be combined with the message for checking or proving the accuracy of the message, and a prefix adapted to be combined with the last said character.

3. A cipher-code comprising vocabulary characters, each of which is associated with a check and a concise statement, a table comprising characters, each of said characters being also associated with a concise statement and a check, said characters being adapted to be used in conjunction with the vocabulary characters to formulate a message, and a general check adapted to be designated by the individual checks and combined with the characters forming the message for checking or proving the accuracy of the message.

4. A cipher-code comprising vocabulary characters, each of which is associated with a check and a concise statement, a plurality of tables comprising designating characters, each of said characters being also associated with a concise statement and a check, each of the tables being provided with an indicator, said vocabulary characters and indicator being adapted to be combined in a message to indicate the specific table of characters to be also used to formulate the message, and a general check adapted to be designated by the individual checks and combined with the message for checking or proving the accuracy thereof.

5. A cipher-code comprising vocabulary characters, each of which is associated with a check and a concise statement, a plurality of tables comprising designating characters, each of said characters being also associated with a concise statement and a check, each of the tables being provided with an indicator, said vocabulary characters and indicator being adapted to be combined in a message to indicate the specific table of characters to be also used to formulate the message, a general check adapted to be designated by the individual checks and combined to the message for checking or proving the accuracy thereof and a common prefix for the general check character.

6. A cipher code comprising vocabulary-words which commence with a consonant and consist of alternate consonants and vowels, each of said words being associated with a check and a concise statement, a table consisting of a plurality of columns of syllables, each syllable comprising a vowel followed by a consonant, and associated with a check and a concise statement, the respective syllables of the various columns of the tables being adapted to be combined with the various vocabulary-words to formulate a message, and a general check adapted to be designated by the respective checks of the words and syllables used and combined with the message for proving the accuracy thereof.

7. A cipher-code comprising vocabulary-words arranged in series, each of said words commencing with a consonant and consisting of a plurality of alternately-arranged consonants and vowels, a predetermined one of said consonants being a series letter to designate the respective series of the word, each of said words being associated with a check and a concise statement, a plurality of tables comprising a series of columns of characters adapted to be combined with the vocabulary-words to formulate a message, said columns comprising alternately-arranged vowels and consonants, each of the characters being associated with a check and a concise statement, and a general check adapted to be designated by the checks of the respective words and characters used and combined with the message for proving the accuracy of the same.

8. A cipher-code comprising vocabulary-words, each of which is associated with a check and a concise statement, a series of characters arranged in tables and comprising a plurality of columns, each of said characters being also associated with a check and a specific designation, said table characters being adapted to be used in conjunction with the vocabulary-words to formulate a message, and a check-table also comprising a series of characters coöperating with the checks of the vocabulary-words and the table characters utilized to formulate a message, for designating an additional character to be added to the message.

9. A cipher-code comprising vocabulary-words, arranged in series, each of said words having a designating character to indicate its respective series and associated with a check and a concise statement, a series of characters arranged in tables and comprising a plurality of columns, each of said characters being also associated with a check and a specific designation, said table characters being adapted to be used in conjunction with the vocabulary-words to formulate a message, and a check-table also comprising a series of characters coöperating with the checks of the vocabulary-words and the table characters utilized to formulate a message, for designating an additional character to be added to the message.

10. A cipher-code comprising vocabulary-words, each of which is associated with a concise statement and a check-numeral, said words being adapted to be combined to formulate a message, and a check-table comprising numerals and characters, coöperating with the check-numerals of the words, the product of said check-numerals being the same as one of the numerals in the check-table, the last said numeral being adapted to designate a character to be combined with the message for proving the accuracy thereof.

11. A cipher-code comprising vocabulary-words, each of which is associated with a concise statement and a check-numeral, said words being adapted to be combined to formulate a message, a check-table comprising numerals and characters, coöperating with the check-numerals of the words, the product of said check-numerals being the same as one of the numerals in the check-table, the last said numeral being adapted to designate a character to be combined with the message for proving the accuracy thereof, and a general character adapted to be combined with any of the characters so designated.

In testimony whereof I have signed my name to this specification, in the presence of two subscribing witnesses, on this 9th day of May, A. D. 1906.

DANIEL C. GURNEE.

Witnesses:
    J. H. JOCHUM, Jr.,
    CHAS. H. SEEM.